(12) United States Patent
Schmid et al.

(10) Patent No.: US 9,086,090 B2
(45) Date of Patent: Jul. 21, 2015

(54) DEVICE FOR THE POSITIONAL SECURING OF A UNIT

(75) Inventors: Jochen Schmid, Alfdorf-Rienharz (DE); Richard Kaisser, Waeschenbeuren (DE); Juergen Bieber, Pluederhausen (DE); Rainer Schaenzel, Essingen (DE)

(73) Assignee: Robert Bosch Automotive Steering GmbH, Gmuend (DE)

( * ) Notice: Subject to any disclaimer, the term of this patent is extended or adjusted under 35 U.S.C. 154(b) by 0 days.

(21) Appl. No.: 14/128,896

(22) PCT Filed: Jul. 11, 2012

(86) PCT No.: PCT/EP2012/063571
§ 371 (c)(1),
(2), (4) Date: Dec. 23, 2013

(87) PCT Pub. No.: WO2013/010873
PCT Pub. Date: Jan. 24, 2013

(65) Prior Publication Data
US 2014/0126976 A1 May 8, 2014

(30) Foreign Application Priority Data
Jul. 20, 2011 (DE) .......................... 10 2011 051 961

(51) Int. Cl.
*F16B 39/32* (2006.01)
*F16B 39/284* (2006.01)
(Continued)

(52) U.S. Cl.
CPC ................ *F16B 39/284* (2013.01); *B62D 3/06* (2013.01); *F16B 39/32* (2013.01); *F16C 33/723* (2013.01); *F16C 35/067* (2013.01)

(58) Field of Classification Search
CPC ........ F16B 39/284; F16B 39/32; F16B 23/00; B25B 13/48; B25B 15/00; B62D 3/06; F16C 33/723; F16C 35/067
USPC ........... 411/326, 114, 115; 74/388 PS, 89.39, 74/422, 409; 180/428, 400
See application file for complete search history.

(56) References Cited

U.S. PATENT DOCUMENTS 3,650,040 A * 3/1972 Statham et al. .................... 34/80
4,403,933 A * 9/1983 Davis et al. ................. 425/129.1
(Continued)

FOREIGN PATENT DOCUMENTS

| DE | 27 41 904 | 3/1979 |
| DE | 39 35 753 | 5/1990 |

(Continued)

OTHER PUBLICATIONS

English Machine Translation of DE39 35 753 A1, Patent Translate, European Patent Office, 12 pages (including claims).*

*Primary Examiner* — Gay Ann Spahn
(74) *Attorney, Agent, or Firm* — Jordan and Hamburg LLP

(57) ABSTRACT

A device for securing a unit in a housing, in particular for securing a fixed bearing of a pinion in a steering gear of a motor vehicle, comprises a securing element which is inserted into a bore in the housing. The securing element is provided with at least one latching lever, wherein the at least one latching lever latches into toothing gaps of a toothing geometry in the bore of the housing via a latching lug disposed at the free end of the latching lever, or wherein at least one latching lug is disposed in the bore, which latches into toothing gaps of a toothing geometry in the securing element.

10 Claims, 3 Drawing Sheets

(51) Int. Cl.
  *B62D 3/06* (2006.01)
  *F16C 33/72* (2006.01)
  *F16C 35/067* (2006.01)

(56) References Cited

U.S. PATENT DOCUMENTS

| | | | | |
|---|---|---|---|---|
| 4,602,521 | A * | 7/1986 | Bishop et al. | 74/498 |
| 4,717,183 | A * | 1/1988 | Nobileau | 285/334 |
| 4,742,883 | A * | 5/1988 | Duffy | 180/428 |
| 5,234,259 | A * | 8/1993 | Nishimuro et al. | 301/64.701 |
| 5,482,132 | A * | 1/1996 | Birsching | 180/428 |
| 5,690,143 | A * | 11/1997 | Birsching | 137/625.23 |
| 5,713,706 | A * | 2/1998 | Lozano | 411/171 |
| 5,971,670 | A * | 10/1999 | Pantzar et al. | 407/34 |
| 5,976,455 | A * | 11/1999 | Pantzar et al. | 419/14 |
| 5,993,128 | A * | 11/1999 | Mark et al. | 411/30 |
| 6,918,723 | B2 * | 7/2005 | Battig et al. | 411/17 |
| 2005/0220569 | A1 * | 10/2005 | Dryer | 411/553 |
| 2007/0009342 | A1 * | 1/2007 | Figge et al. | 411/546 |
| 2008/0044659 | A1 * | 2/2008 | Pilpel | 428/411.1 |
| 2008/0213065 | A1 * | 9/2008 | Sussenbach | 411/411 |
| 2008/0253905 | A1 * | 10/2008 | Morando et al. | 417/321 |
| 2009/0263206 | A1 | 10/2009 | Hirose et al. | |
| 2012/0186390 | A1 * | 7/2012 | Cook et al. | 74/640 |
| 2014/0013901 | A1 * | 1/2014 | Urbach | 74/606 R |
| 2014/0144264 | A1 * | 5/2014 | Raab et al. | 74/89.39 |

FOREIGN PATENT DOCUMENTS

| | | |
|---|---|---|
| DE | 10 2004 017 259 | 11/2004 |
| DE | 10 2010 008 404 | 8/2011 |
| EP | 1 9114 430 | 4/2008 |
| EP | 2 354 481 | 8/2011 |
| FR | 2 853 383 | 10/2004 |
| WO | WO-00/73672 | 12/2000 |
| WO | WO-2009/001421 | 12/2008 |
| WO | WO 2013/010863 A1 * | 1/2013 |

* cited by examiner

DEVICE FOR THE POSITIONAL SECURING OF A UNIT

BACKGROUND OF THE INVENTION

The invention relates to a device for the positional securing of a unit in a housing, in particular for the positional securing of a pinion in a steering gear of a motor vehicle.

Known positional securings are implemented via bolted connections, e.g. steel screws, having a metric thread. The screw lock is achieved in a force-locking manner via a tightening torque, via caulking, or via an adhesive joint. In known securings, a bearing, for example, is fixed with the aid of a zinc die-cast adjusting screw, for example, which is fixed in the position thereof according to a defined tightening torque with the aid of a caulking process.

The use of materials having different coefficients of thermal expansion poses a problem, however, in so much as the securing effect diminishes over the service life and/or play may even result. The setting properties of the material of the adjusting screw relative to the housing material also negatively affect securing or fixation. It is also disadvantageous that the adjusting screw must be fixed in the position in the housing in a separate working cycle. Given that the preload of the adjusting screw may decrease to zero over the course of the service life, it is possible for play to form between the unit to be secured, e.g. a fixed bearing, and the adjusting screw or the housing. The result is frictional wear, and acoustic problems can occur.

A thread sealing agent is often used for sealing against external media, which also increases the complexity of the manufacturing and/or assembly process.

The problem addressed by the present invention is therefore that of creating a low-cost and easily assembled device for securing a unit, wherein play-free fixation is provided throughout the service life.

SUMMARY OF THE INVENTION

The embodiment of the securing device according to the invention having a securing element, which is provided with at least one latching lever and a latching lug, wherein the securing element works together with a toothing geometry in a bore in the housing, ensures the absence of play and, therefore, secure fixation of the unit, e.g. a fixed bearing, is achieved, even given different coefficients of thermal expansion.

As an alternative to this solution, in a kinematic reversal, the at least one latching lever having the latching lug can also be disposed in the bore in the housing, e.g. on an insertion ring inserted into the bore, wherein, in this case, the securing element is provided with a toothing geometry, into the gaps of which the latching lug can latch.

In a very advantageous embodiment of the invention, the securing element is designed as a securing screw, which is connected to an internal thread of the bore of the housing via an external thread, wherein the securing screw is provided with latching levers disposed distributed around the circumference thereof, and wherein the latching levers latch into toothing gaps of the toothing geometry of the housing via latching lugs disposed at the free ends of the latching levers in each case.

Further advantageous embodiments and developments will become apparent from the exemplary embodiment, which is described in principle with the aid of the drawings.

Wherein.

Figure 1:
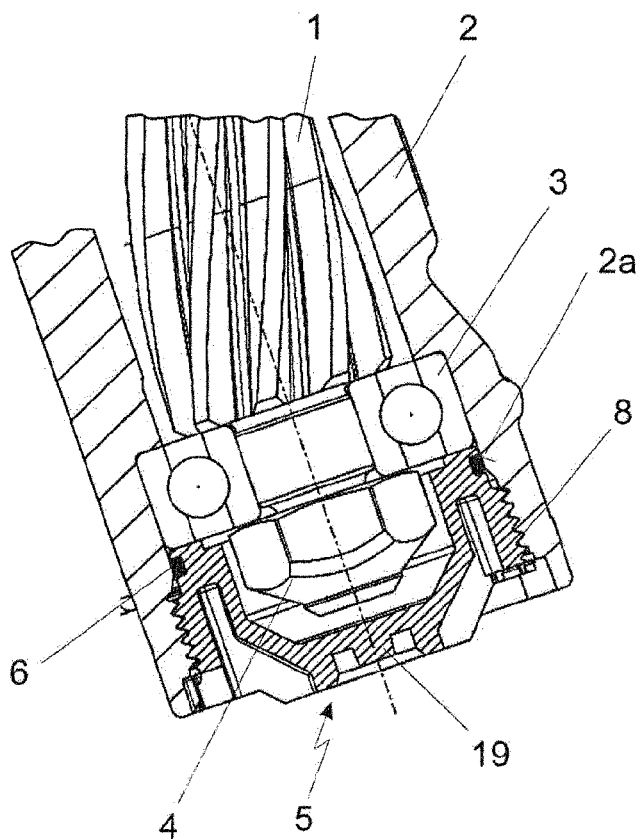
FIG. 1 shows a section of a steering gear of a motor vehicle supported and secured by the pinion according to the invention.

The invention is described in the following using the example of use of the securing device in a steering gear of a motor vehicle, wherein a pinion is supported in a gearbox housing via a fixed bearing.

Of course, the securing device according to the invention can be used in highly diverse fields, where there is a desire for a low-cost, reliable, and easily assembled securing device for a bearing, a guidance sleeve, a bearing sleeve, a gearwheel, or any other type of gearbox part, an adjusting screw for a thrust member for a rack in a steering gear and similar applications. Use of the securing device according to the invention in a chassis of a motor vehicle is also possible.

Steering gears for motor vehicles comprising a pinion and a rack are generally known, for the purpose of which reference is made to DE 10 2004 017 259 A1, for example, and thus only the parts that are essential to the invention will be discussed in greater detail hereafter.

A pinion 1 is supported in a gearbox housing 2 via a fixed bearing 3. The pinion is connected, in a known manner, to a steering wheel (not illustrated) and a rack, which is also not illustrated, in order to convert rotational motion into linear motion. A nut 4 screwed onto the pinion hub is used to secure the pinion 1 to the internal ring of the fixed bearing 3.

According to the invention, a securing screw 5 comprising a plastic body as a hollow screw is provided in order to secure and fix the external ring of the fixed bearing 3.

Instead of plastic, other materials are also possible within the scope of the invention, such as, for example, other non-metals, a sintered part, or a hybrid element.

A sealing ring 6 in an annular groove of the securing screw 5 performs a sealing function.

If the securing screw 5 is made of a plastic body as an injection-molded part, then, in the case of a multi-component injection-molded part, the sealing ring 6, serving as a soft component made of silicone, for example, can be fixedly connected to the plastic body of the securing screw in the injection process. Such an embodiment has the advantage that manufacture and assembly are simplified.

Figure 2:
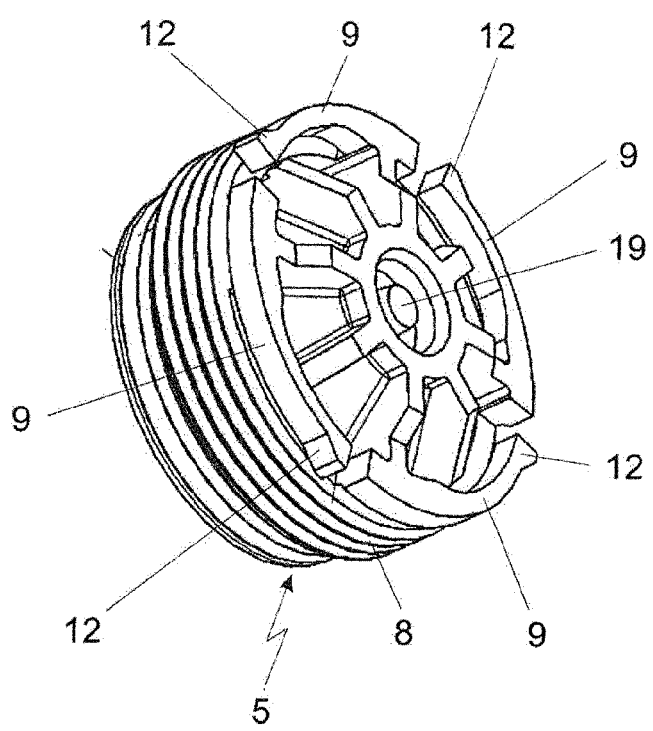
FIG. 2 shows a three-dimensional depiction of the securing device according to the invention.
Figure 3:
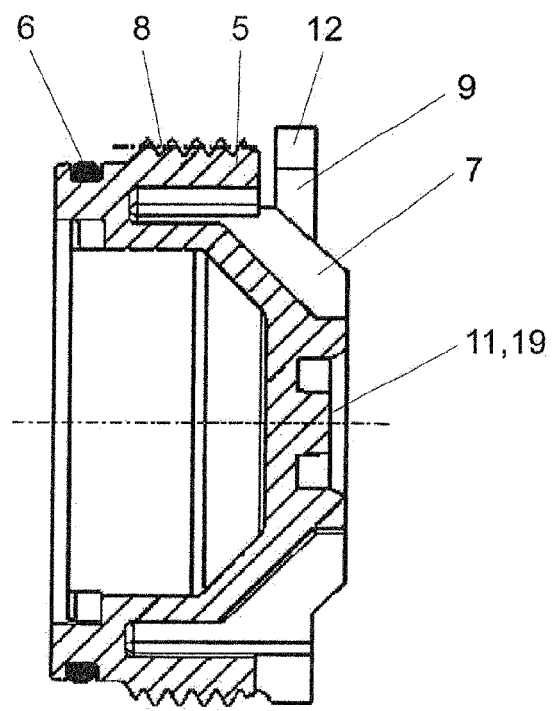
FIG. 3 shows a cross section of the device according to the invention.
Figure 4:
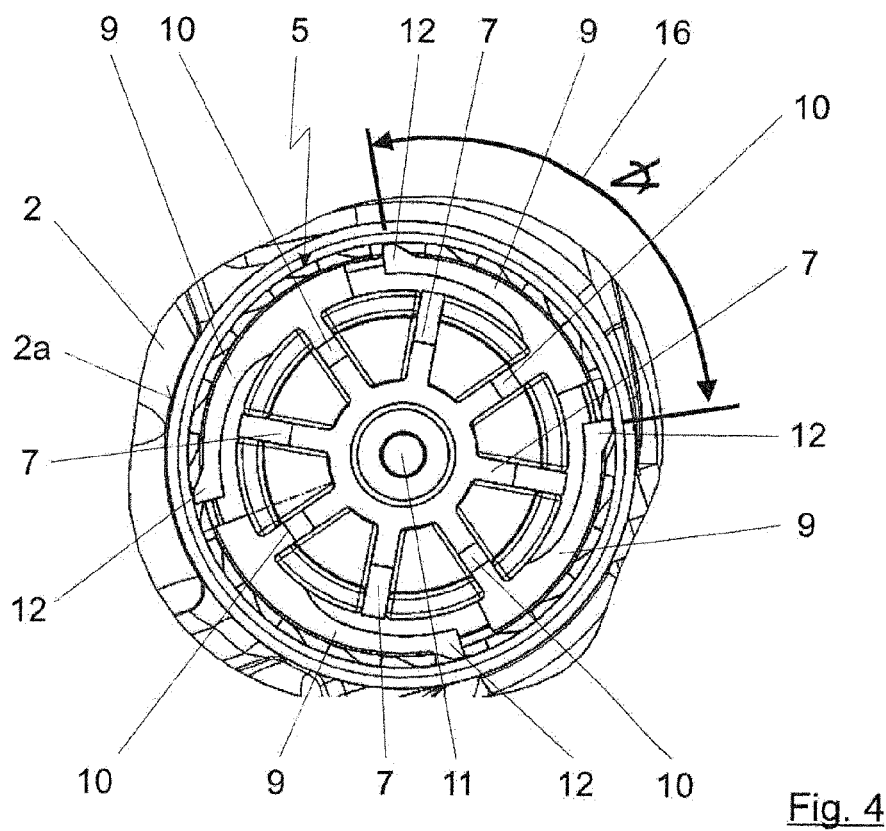
FIG. 4 shows a front view of the device according to the invention.
Figure 5:
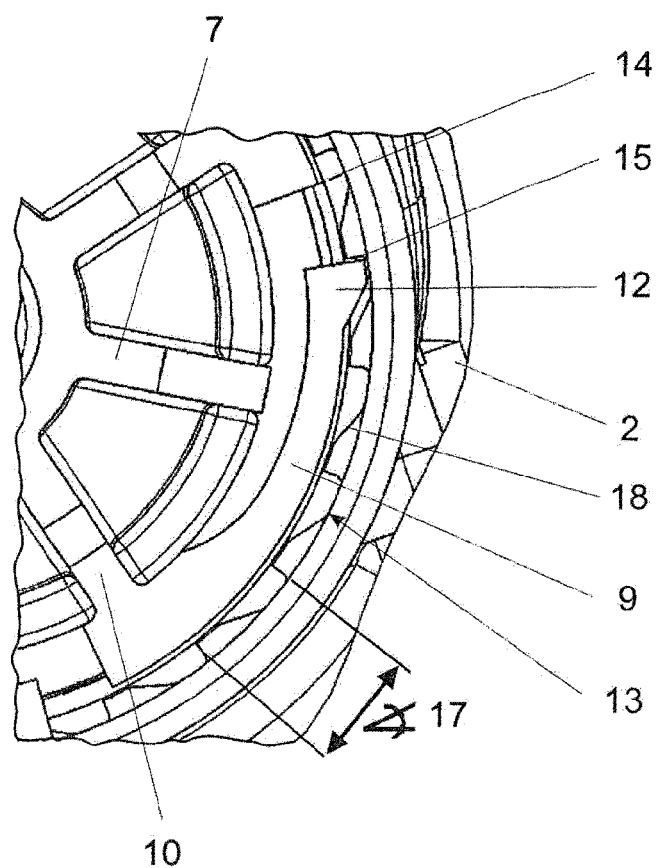
FIG. 5 shows a section of an enlargement of the front view according to FIG. 4.

The external thread 8 of the securing screw 5 works together with an internal thread in the gearbox housing 2. Upon assembly, the securing screw 5 is tightened to a stop by a certain torque. In order to screw in the securing screw 5, this securing screw is provided with a plurality of rib-shaped, radially extending driving elements 7 (see, in particular. FIGS. 2 and 4).

Of course, it is also possible, however, to provide a so-called "overhung" screw fitting for this purpose, which is characterized by the securing screw 5 being screwed in depending on a rotational angular position or a depth of thread engagement or a length of thread engagement.

Axial forces resulting via the pinion 1 and the fixed bearing 3 must be absorbed without play. The forces are therefore introduced into the gearbox housing 2 via the self-locking external thread 8 of the securing screw.

The screw lock is formed by a radially adjusting latch mechanism. To this end, the securing screw 5 is provided, on the circumference thereof, with a plurality of latching levers 9, which are connected to a central piece 11 of the securing screw via radial spokes 10 in the region of an end of each latching lever 9. The radial spokes 10 can also be part of the rib-shaped driving elements 7, of course. In the exemplary embodiment, four latching levers 9 are disposed distributed around the circumference. Other numbers are also possible within the scope of the invention, of course.

Figure 6:
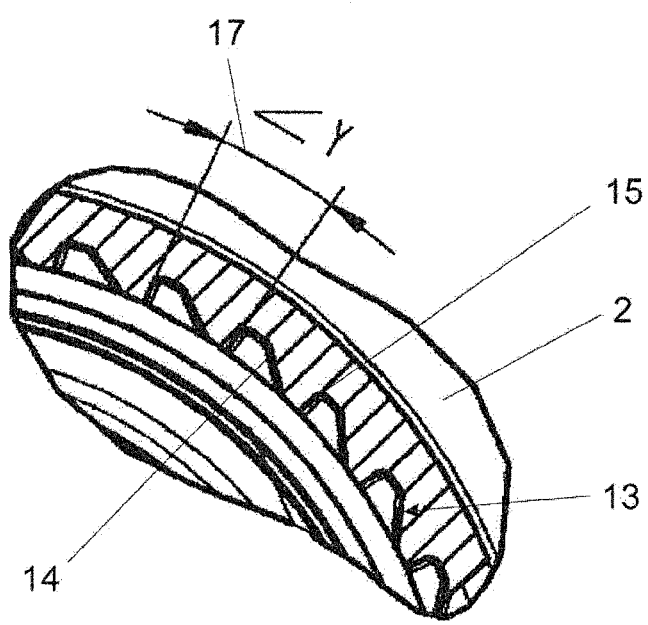
FIG. 6 show a section of an enlargement of the toothing geometry in the housing of the steering gear for latching levers of the securing device.

The latching levers 9 are provided with latching lugs 12 on the free ends thereof facing away from the spokes 10. The latching lugs 12 of the latching levers 9 latch in a toothing geometry 13 in the gearbox housing 2 (see, in particular, the enlarged depiction of the toothing geometry in FIG. 6). The latching of the latching lugs 12 into the toothing geometry 13 of the gearbox housing 2 prevents the securing screw 5 from loosening independently.

As the securing screw 5 is screwed into the gearbox housing 2, the latching levers 9 are deflected radially via bevels 18 in the gearbox housing 2 and, when the predetermined torque is reached, these latching levers latch into toothing gaps 14 of the toothing geometry 13. The securing screw 5 is prevented from rotating in the reverse direction via the sawtooth-shaped contour of the toothing geometry 13. To this end, the latching lugs 9 bear against contact surfaces 15 in the toothing gaps 14 of the toothing geometry 13.

Instead of a deflection of the latching lugs 9 in the radial direction, these latching lugs can also be deflected axially, if necessary, and latch similarly into toothing gaps of the toothing geometry in the bore of the housing.

The opposite principle, or a reversed solution, is also possible in this case, according to which latching lugs disposed in the bore 2a axially latch similarly into a toothing geometry of the securing screw 5.

The latching lever angular pitch 16 is designed asymmetrical (see FIG. 4) in order to permit the plastic screw 5 to be tightened upon assembly in a manner independent of the rotational angle. Similarly, the toothing geometry 13 in the gearbox housing 2 is designed with the smallest possible angular pitch 17. In this manner, it is always ensured that at least two latching lugs 12 are securely latched independently of the rotational angle. Asymmetry results in greater resolution and a greater likelihood of latching in the sense of a "vernier" effect.

An asymmetrical latching lever angular pitch 16 means that the latching levers are not disposed evenly distributed around the circumference. In the case of four latching levers, for example, it is possible to provide different angular pitches and different lengths instead of exactly four times 90°. If a small angular pitch 17 between the individual toothing gaps 14 (see FIG. 6) of, e.g. 15°, is selected, for example, the asymmetrical latching lever angular pitch 16 ensures that secure latching is always possible approximately every 4° (based on the current application).

The securing screw 5, in the embodiment comprising a plastic body, can be made of a fiber-reinforced thermoplastic as an injection-molded part, for example, which is characterized by temperature-resistant behavior. In the case of a temperature change, the expansion behavior of the plastic body is determined by the material and the fiber orientation. To this end, the fibers are laid out such that these fibers extend in the direction of the expected greater expansion.

Due to the long bending lengths that are possible, latching levers 9 made of high-tensile strength plastics having a low fracture strain can be used.

The star-shaped arrangement of the driving elements 7 and the spokes 9 having a central injection point on the front side 19 permits optimal flowing behavior of the plastic in the injection process in order to prevent shrinkage cavities and porosities. This embodiment therefore provides a further advantage, in addition to that of absorbing the torque from an installation tool as the securing screw 5 is screwed in.

The thread of the plastic body of the securing screw 5 can be designed as a metric V-thread, wherein the flank diameter of the thread is designed such that only slight thread play is present.

Other thread shapes are also possible within the scope of the invention, of course, such as a conical thread, for example.

The internal toothing in the gearbox housing 2 and the toothing geometry 13 can be ready cast. A small tolerance can also be implemented, as necessary, via control machining of the toothing geometry 13 in the housing 2.

LIST OF REFERENCE CHARACTERS

1 pinion
2 gearbox housing
2a bore
3 fixed bearing
4 nut
5 securing element, securing screw
6 sealing ring
7 driving elements
8 external thread
9 latching lever
10 spoke
11 central piece
12 latching lug
13 toothing geometry
14 toothing gaps
15 contact surface
16 latching lever angular pitch
17 angular pitch
18 bevels
19 injection point

The invention claimed is:

1. A device for securing a position of a fixed bearing of a pinion in a steering gearbox housing of a motor vehicle, comprising:
  a securing element having a first section including an external thread and a second section including a radially adjusting latch mechanism, the securing element having a longitudinal depth;
  the securing element mating into a bore of the gearbox housing along said first section;
  the radially adjusting latch mechanism comprising a center hub, a plurality of rib elements extending radially from the center hub, and a plurality of latching levers;
  wherein each one of said plurality of rib elements is configured as a spoke of the center hub;
  wherein for at least a first subset of said plurality of rib elements each one rib element of said first subset has a portion that inclines from one radial point to another radial point of said one rib element so that the first radial point is at one longitudinal depth of the securing element and the second radial point is at a different longitudinal depth of the securing element;
  wherein for at least a second subset of said plurality of rib elements, a corresponding one of said plurality of latching levers is integral to an end of a corresponding rib element of said second subset and extends circumferentially to a distal end at which is located a latching lug;
  wherein said plurality of latching levers are unevenly distributed about a circumference of the second section; and wherein said latching lug for at least one of said plurality of latching levers is configured to latch into a toothing gap of a toothing geometry in said bore of the steering gearbox housing to secure said position of said fixed bearing in said steering gearbox housing.

2. The device according to claim 1, wherein said first section is hollow.

3. The device according to claim 1, wherein said plurality of latching levers comprise at least four latching levers disposed distributed around the circumference of the second section.

4. The device according to claim 1, wherein the plurality of latching levers are spaced apart along a circumference of the second section to have an interspacing between a distal end of each one latching lever and a proximal end of an other latching lever nearest to said distal end, wherein said interspacing is larger than said toothing gap in the toothing geometry of the steering gearbox housing for each said interspacing among said plurality of latching levers.

5. The device according to claim 1, wherein the securing element is a plastic body made of a fiber-reinforced thermoplastic as an injection-molded part or as a multi-component part.

6. The device according to claim 5, wherein an orientation of fibers in the thermoplastic extends in a direction of a greatest thermal expansion of said thermoplastic.

7. The device according to claim 5, wherein the plastic body is provided with a central injection point.

8. The device according to claim 1, wherein the external thread comprises a metric V-thread.

9. The device according to claim 1, wherein the external thread comprises a conical thread.

10. The device according to claim 5, wherein the plastic body is a multi-component injection-molded part, and further comprising a sealing ring, the securing element mating into said bore of the gearbox housing and having an annular groove into which is received the sealing element which seals the securing element within the gearbox housing.

* * * * *